Patented Oct. 5, 1937

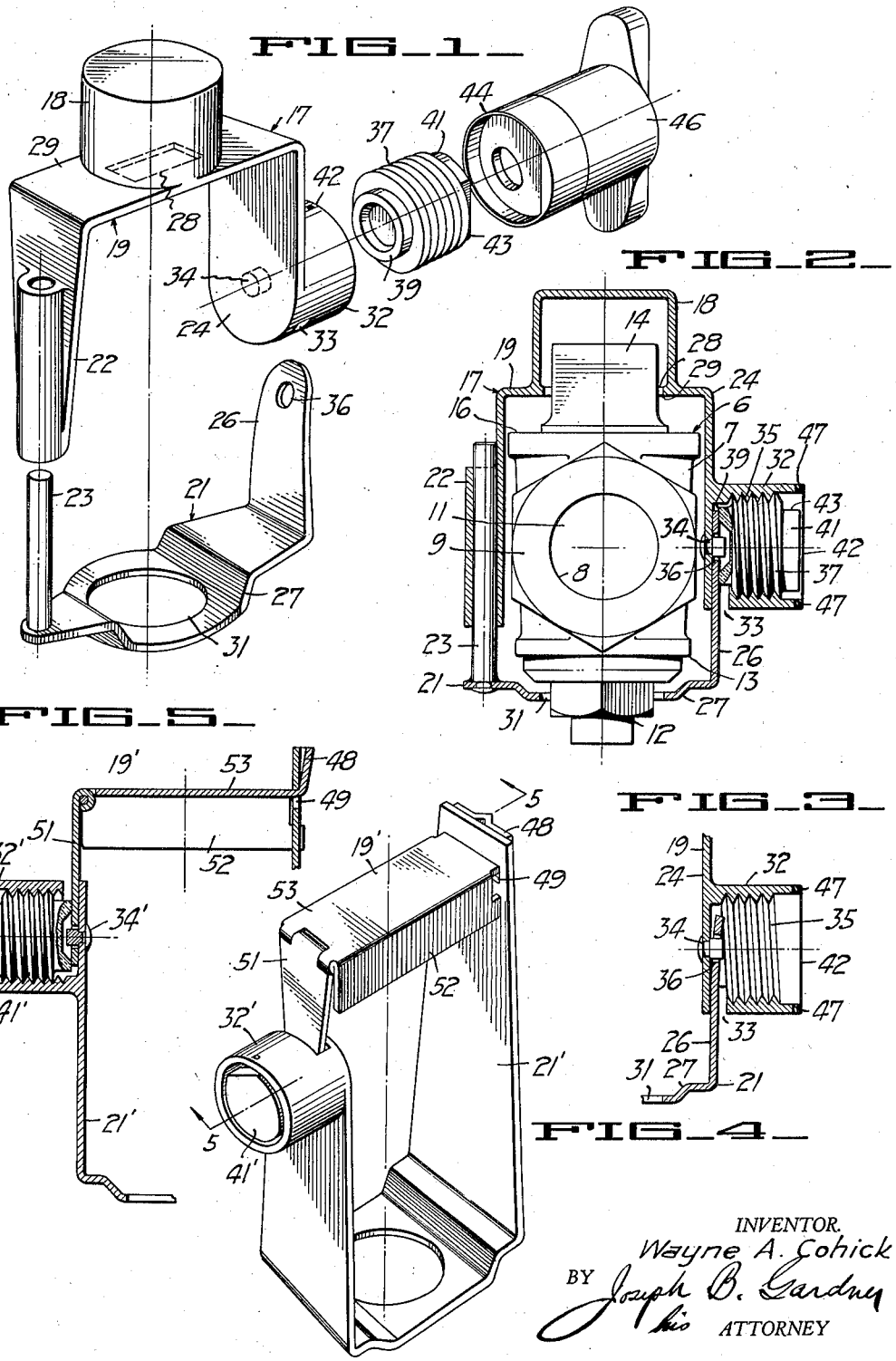

2,094,773

UNITED STATES PATENT OFFICE 2,094,773

VALVE LOCK

Wayne A. Cohick, Oakland, Calif.

Application May 22, 1935, Serial No. 22,764

2 Claims. (Cl. 70—178)

The invention relates to devices used in connection with stopcocks such as used in pipes for delivery of water or gas or the like for preventing the unauthorized openings of the cocks after the same have been closed by the utility or supply company.

An object of the invention is to provide a device of the character described which will have an improved form of locking means embodying as a part thereof a releasable threaded plug means heretofore used in a different fashion for sealing and preventing access to electric fuse receptacles and the like, whereby the procedure and instruments used in connection with the sealing of electric, gas or water mains may be rendered uniform and standardized.

Another object of the invention is to provide a device of the character described which may be readily applied to existing types of gas valves and which does not require or depend upon the provision of any special projections or openings or the like on the valve casing for securing the device on the valve casing against removal or displacement.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a perspective view of the device constructed in accordance with the present invention and is shown with the several parts thereof in aligned detached position ready for assembly.

Figure 2 is a vertical sectional view of the device shown in Figure 1 and shown in operatively assembled relation on a valve.

Figure 3 is a fragmentary sectional view showing the cooperating locking portions of the device.

Figure 4 is a perspective view of a slightly modified form of the invention.

Figure 5 is a fragmentary vertical sectional view of the device shown in Figure 4 and is taken substantially on the plane of the line 5—5 of Figure 4.

The locking device of the present invention is particularly adapted for use with a gas, water or other type fluid valve 6 and serves when applied thereto to prevent an unauthorized opening of the valve subsequent to a closing of the valve by the supply or utility company furnishing the gas or other fluid. A common type of this valve is shown in Figure 2, and as will be understood, comprises a casing 7 provided with a passageway 8 therethrough and which passageway communicates at the periphery of the casing with a pair of offset conduit connecting portions 9. Disposed transversely through the passageway is a valve 11, which in the present case is mounted for rotation therein, for permitting or stopping of fluid flow through the passageway, by means of a bearing member 12 which extends through one side 13 of the casing and a valve stem 14 which extends through an opposite side 16 of the casing. Usually the outer end of the valve stem is flattened, as here shown, or otherwise formed for engagement by a wrench so as to permit the ready opening or closing of the valve.

The device of the present invention is adapted for mounting on the valve casing in a manner engaging and preventing an unauthorized turning of the valve stem, and as an important feature thereof is designed to utilize a multiple piece locking means which is engageable with the device to prevent the removal thereof from the casing and wherein a part of the means is retained by the device when locked thereby on the casing, while another part is removed by the applier of the device and serves as a key and as the substantially sole means of effecting the loosening of the first member and a removal of the device from the valve. Such a multiple piece member, as will be understood, has been heretofore used in a substantially different manner for sealing and preventing access to electric fuse receptacles, and in accordance with the present invention a device has been developed to make possible a similar use of these means for locking of a gas or other type valve, whereby the procedure and instruments used in connection with the sealing off of the electric, gas or water supply may be uniformly adopted.

The present device with reference to the drawing comprises a guard or frame 17 which is arranged to extend about a portion of the periphery of the valve casing 7 and is provided with a closed receptacle 18 positionable over to prevent access to the valve stem 14, and which utilizes the aforementioned locking means for holding the guard or frame against removal or displacement on the valve casing. Preferably the frame is comprised of a pair of attachable sections 19 and 21 having adjacent side portions 22 and 23, and 24 and 26 which are formed to slidably embrace one another in moving the sections to and from an attached position on the valve casing. As here shown in Figures 1 and 2, the side 22 is formed with a tubular barrel which is adapted to receive the side 23 which in the present case is formed as a pin riveted at its lower end to a bottom side 27 of the frame section 21. As will be clear from the drawing, the section 19 is provided with the aforementioned receptacle 18 and the latter is formed with an elongated opening 28 in the base 29 thereof, which is adapted to receive the valve stem 14 and hold the same against displacement relative to the frame. As will be perhaps best seen from Figure 2, the end portion 27 of the frame section 21 is provided with a slightly depressed center portion which is formed with an opening 31 adapted to receive and confine the lower end of the frame to and about the bearing member 12. As will be further clear from Figure 2, the sides of the frame will extend about the valve casing between the offset conduit projecting portions 9 and be held by such portions against rotation about the valve casing. The means for locking the sections in assembled relation on the valve is provided for on the cooperating sides 24 and 26 of the frame sections and includes an internally threaded receptacle 32 provided on the lower end of the side 24, and which is formed with a transverse opening 33 at the lower side thereof for reception of the upper end of the side 26. Retention of this latter side in the receptacle is arranged to be effected by a pin 34 which is carried by the side 24 in projecting relation into the receptacle 32, and which is arranged to engage in an opening 36 provided in the upper end of the frame side 26. Preferably, as shown in Figure 3, the upper end of the valve side 26 is bent outwardly slightly so as to facilitate deflection thereof on initial engagement with the pin, and the side 26 is preferably disposed and so connected to the end 27 as to spring against the side 24 upon registration of the pin and opening whereby a proper initial connection between the pin and opening will be effected.

In accordance with the present invention, the sides 24 and 26 of the frame sections are arranged to be held in interlocked engagement by the pin and opening aforesaid through the use of the two piece locking means hereinbefore referred to. This locking means, as will be clear from Figures 1 and 2, comprises a threaded plug 37 which is adapted to engage with internal threads 35 provided in the receptacle 32, and which when screwed in the receptacle will engage at its inner end 39 the upper end of the frame side 26 and firmly hold the same against the side 24 in interlocked relation over the pin 34. The opposite end of the plug is formed with a reduced annular shoulder 41 and is of a length as to lie completely enclosed within the outer end 42 of the receptacle. The shoulder is provided with a flattened portion 43 to permit engagement thereof for turning by a complementary formed cylindrical end 44 on the second mentioned piece 46 of the locking means. This member 46, as will be understood, serves as a key for turning the plug into locked position within the receptacle, and when removed by the operator applying the device leaves the plug in the receptacle without any apparent means of removal without mutilating or in some detectable way defacing the plug. Accordingly, the member 46 comprises substantially the only means for releasing the plug to enable removal of the device from the valve. Thus, after the frame has been operatively positioned on the valve, and the plug 41 screwed into place, and the key 46 removed, the valve will be securely held in locked position and protected against an unauthorized opening. If desired, a pair of openings 47 may be provided through the periphery of the receptacle adjacent the outer end thereof for the reception of a sealing wire.

In Figures 4 and 5, I have shown a slightly modified form of the foregoing construction so as to adopt a device similar to a lock heretofore used for use with the novel locking means of the present invention. As here shown, the frame, instead of comprising a pair of slidably attached sections, as in the first embodiment, utilizes a construction wherein a pair of sections 19' and 21' are hingedly associated by the extension of an offset end 48 on the section 19' through an opening 49 adjacent a free end of the section 21'. Also as will be clear from these figures, the aforementioned locking means including in the present embodiment a receptacle 32', pin 34' and plug 41', are associated with a free end of the section 21' and are arranged to coact with a hinged arm 51 provided on the section 19'. In the present embodiment, the section 19' is provided with depending side portions 52 which cooperate with the outer side 53 of the section to form an enclosure for the stem of the valve.

I claim:

1. A valve locking means of the character described comprising, a pair of frame sections arranged to extend about opposite sides of the valve, means on one of said sections for positioning in covering relation over the operating part of the valve, means for connecting the sections against removal from the valve including an open sided threaded receptacle on one section arranged to receive through a side thereof an end of the other section, cooperating means in said receptacle and on said end for locking the same together, and a plug threadable into the open side of said receptacle for holding said cooperating means in interlocked engagement.

2. In combination with a valve including a casing having a passage therethrough communicating at the periphery of the casing with offset conduit connecting portions and a valve in said passage having a stem for turning the valve extending through and to the outer side of said casing intermediate said portions, a frame comprising a pair of sections arranged to fit about said casing and prevent access to said stem for turning, one of said sections being formed with a closed receptacle having an aperture for receiving said stem and having a pair of spaced sides, an open sided threaded receptacle formed on one of said arms having a projection therein opposite the open side thereof, the other side of said section being formed tubular, the other section having spaced sides one arranged to slidably extend into the tubular side of the first section and the other side to extend into said threaded receptacle, said last named side engaging and interlocking with said projection, and a plug removably carried in said threaded receptacle for holding said last named side and projection in interlocked relation.

WAYNE A. COHICK.